W. S. HADAWAY, Jr.
ELECTRIC HEATER.
APPLICATION FILED MAY 1, 1909.

1,018,558.

Patented Feb. 27, 1912.

WITNESSES:
Fred H Miller
R H Carbon

INVENTOR
William S. Hadaway Jr.
BY
Sidney Sloan
ATTORNEY

UNITED STATES PATENT OFFICE.

WILLIAM S. HADAWAY, JR., OF EAST ORANGE, NEW JERSEY, ASSIGNOR TO WESTINGHOUSE ELECTRIC AND MANUFACTURING COMPANY, A CORPORATION OF PENNSYLVANIA.

ELECTRIC HEATER.

1,018,558.

Specification of Letters Patent.   Patented Feb. 27, 1912.

Application filed May 1, 1909.   Serial No. 493,406.

*To all whom it may concern:*

Be it known that I, WILLIAM S. HADAWAY, Jr., a citizen of the United States, and a resident of East Orange, in the county of Essex and State of New Jersey, have invented a new and useful Improvement in Electric Heaters, of which the following is a specification.

My invention relates to electric heating devices, and it has for its object to provide a device of this character that shall be specially adapted for heating water and other fluids in open tanks or culinary vessels.

Patent No. 890,855, granted, June 16, 1908, to the Hadaway Electric Heating & Engineering Co., illustrates and describes a means for rapidly and economically heating water which comprises an electric heater secured to the wall of the liquid-containing vessel and a partition for so dividing the liquid in the receptacle as to produce a thin film adjacent to the electrically heated wall. The advantages of this arrangement are evident, but the best results are secured by distributing the electric heating element over a large percentage of that portion of the side wall which is in contact with the liquid under normal conditions.

According to my present invention, I provide a heating device which is entirely independent of the liquid-containing vessel and may be readily transferred from one vessel to another.

Furthermore, the device constitutes a dividing partition in the liquid in order to facilitate vaporization by transferring the heat directly to a relatively small body of liquid.

The structure of the device is such that it may or may not float, thereby adapting it for use with very large, as well as small, bodies of liquid.

My invention is illustrated in the accompanying drawings, in which—

Figure 1:
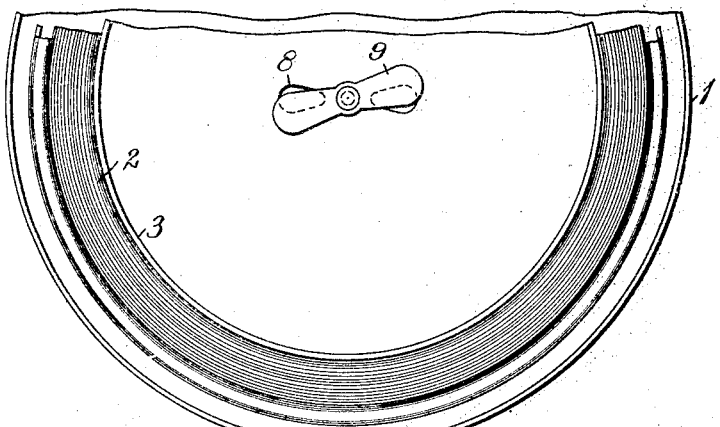
Figure 2:
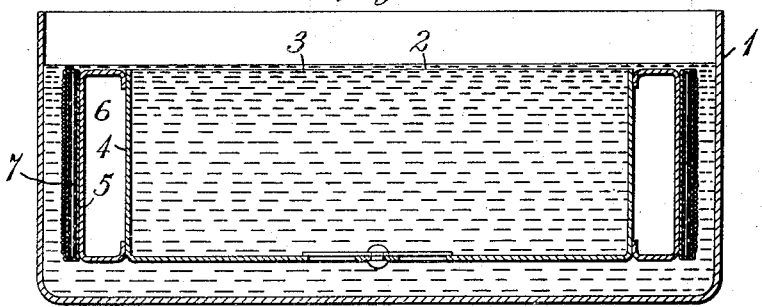
Figures 3, 4:
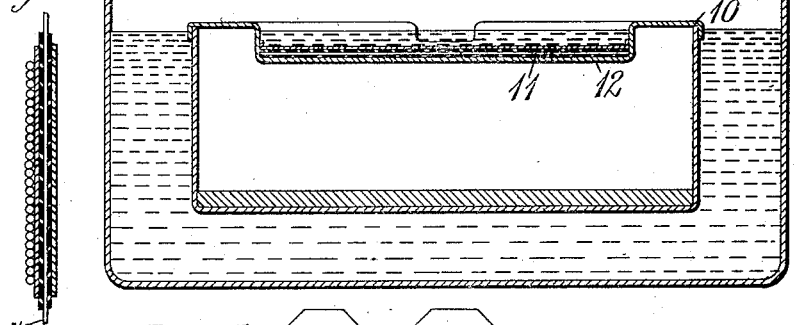
Figure 5:
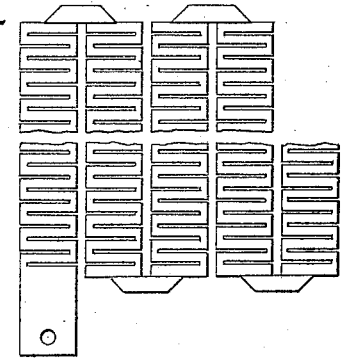

Figure 1 is a partial plan view and Fig. 2 is a sectional elevation of a device constructed in accordance therewith. Fig. 3 is a detail sectional view, on a larger scale, illustrating the construction of the heating element shown in Fig. 2. Fig. 4 is a view, corresponding to Fig. 2, of a modified structure embodying my invention, and Fig. 5 is a detail view of the heating element employed in the device shown in Fig. 4.

Referring to Figs. 1, 2 and 3 of the drawings, a fluid-containing vessel 1 is provided with a heater 2 which comprises a substantially cylindrical vessel of sheet metal having double side walls 4 and 5 which form an annular air-tight compartment 6. A resistance element 7 is securely bound to the outer surface of the outer wall 5 by means of band wire in a manner similar to that shown in my co-pending application, Serial No. 445,200. The bottom of the vessel 3 may or may not be perforated, according to the buoyancy of the annular chamber 6 and the service for which the heating device is intended. As shown in Figs. 1 and 2 of the drawings, the bottom of the vessel is provided with holes 8 which may or may not be covered by an adjustable slide or damper 9. The best results are secured when a sufficient amount of liquid is admitted to the interior of the vessel 3 to keep the electric heating element submerged in the fluid. The annular air-tight compartment 6 serves not only to give buoyancy to the device, but also to prevent the conduction of heat from the element 7 to the large body of liquid within the vessel 3, thereby facilitating the heating of the thin film of liquid on the other side of the heater element.

In Fig. 4, I have illustrated a floating heater 10 in which the resistance element 11 is secured to and is insulated from a cover plate 12 of the device, the arrangement of parts and the specific gravity of the device being such that a thin film of the liquid will always cover the depression in the plate 12. The resistance elements 7 and 11 are preferably composed of slotted ribbons arranged as shown in Fig. 5.

It is evident that structural modifications may be effected in the devices illustrated without departing from the spirit of my invention, and I desire that only such limitations shall be imposed as are indicated in the appended claims.

I claim as my invention:

1. An electric heater adapted for insertion in a body of liquid and comprising an air chamber and an insulated resistance element secured to a submerged wall thereof.

2. An electric heater adapted for flotation in a body of liquid and comprising an air chamber and an insulated resistance element secured to a submerged wall thereof.

3. An electric heater adapted for submersion in a body of liquid and comprising an annular air chamber and an insulated resistance element secured to the outer cylindrical wall of said chamber.

4. The combination with a liquid-containing vessel, of an electric heating device therefor comprising an air-containing vessel adapted for flotation and having a contour which corresponds to that of the liquid-containing vessel and a resistance element secured to the outer surface of said air-containing vessel, the diameters of the vessels being such that a thin film of liquid is maintained between them.

In testimony whereof, I have hereunto subscribed my name this 20th day of April, 1909.

WILLIAM S. HADAWAY, Jr.

Witnesses:
R. J. DEARBORN,
B. B. HINES.

Copies of this patent may be obtained for five cents each, by addressing the "Commissioner of Patents, Washington, D. C."